United States Patent
Crocco et al.

(10) Patent No.: US 8,537,075 B2
(45) Date of Patent: Sep. 17, 2013

(54) ENVIRONMENTAL-LIGHT FILTER FOR SEE-THROUGH HEAD-MOUNTED DISPLAY DEVICE

(71) Applicants: Robert Crocco, Seattle, WA (US); Ben Sugden, Surrey (GB); Kathryn Stone-Perez, Kirkland, WA (US)

(72) Inventors: Robert Crocco, Seattle, WA (US); Ben Sugden, Surrey (GB); Kathryn Stone-Perez, Kirkland, WA (US)

( * ) Notice: Subject to any disclaimer, the term of this patent is extended or adjusted under 35 U.S.C. 154(b) by 0 days.

(21) Appl. No.: 13/692,861

(22) Filed: Dec. 3, 2012

(65) Prior Publication Data

US 2013/0162505 A1 Jun. 27, 2013

Related U.S. Application Data

(63) Continuation of application No. 13/166,346, filed on Jun. 22, 2011, now abandoned.

(51) Int. Cl.
*G09G 5/00* (2006.01)
(52) U.S. Cl.
USPC .................... 345/7; 359/630; 349/11
(58) Field of Classification Search
USPC ........... 345/7–9, 419, 633; 359/630; 349/11, 349/13, 15; 463/32
See application file for complete search history.

(56) References Cited

U.S. PATENT DOCUMENTS

| | | | |
|---|---|---|---|
| 5,774,268 A | 6/1998 | Takahashi | |
| 6,064,749 A * | 5/2000 | Hirota et al. | 382/103 |
| 7,307,791 B2 | 12/2007 | Li | |
| 7,401,920 B1 * | 7/2008 | Kranz et al. | 351/210 |
| 7,405,881 B2 | 7/2008 | Shimizu et al. | |
| 7,717,173 B2 * | 5/2010 | Grott | 166/267 |
| 8,314,815 B2 * | 11/2012 | Navab et al. | 345/633 |
| 8,373,618 B2 * | 2/2013 | Friedrich et al. | 345/7 |
| 8,405,680 B1 * | 3/2013 | Cardoso Lopes et al. | 345/633 |
| 2005/0174470 A1 | 8/2005 | Yamasaki | |
| 2006/0198027 A1 | 9/2006 | Li | |
| 2010/0053030 A1 | 3/2010 | Sprague | |
| 2010/0194872 A1 * | 8/2010 | Mathe et al. | 348/77 |
| 2010/0197399 A1 * | 8/2010 | Geiss | 463/32 |
| 2011/0205242 A1 * | 8/2011 | Friesen | 345/633 |
| 2012/0007852 A1 * | 1/2012 | Morate et al. | 345/419 |
| 2012/0062445 A1 * | 3/2012 | Haddick et al. | 345/8 |
| 2012/0068913 A1 * | 3/2012 | Bar-Zeev et al. | 345/8 |
| 2012/0075343 A1 * | 3/2012 | Chen et al. | 345/633 |
| 2012/0113141 A1 * | 5/2012 | Zimmerman et al. | 345/633 |
| 2012/0154557 A1 * | 6/2012 | Perez et al. | 348/53 |

OTHER PUBLICATIONS

Yamazoe, et al., "Improved Visibility of Monocular Head-mounted Displays through the Bright Control of Backlighting", In journal of display technology, vol. 6, Issue 9, Sep. 2010, 7 pages.
Brandtberg, et al., "Head-mounted Displays", Published on: 1997, Available at: http://smartdata.usbid.com/datasheets/usbid/2000/2000-q4/1997015.pdf.

\* cited by examiner

*Primary Examiner* — Joe H Cheng
(74) *Attorney, Agent, or Firm* — Shook Hardy & Bacon LLP

(57) ABSTRACT

An environmental-light filter removably coupled to an optical see-through head-mounted display (HMD) device is disclosed. The environmental-light filter couples to the HMD device between a display component and a real-world scene. Coupling features are provided to allow the filter to be easily and removably attached to the HMD device when desired by a user. The filter increases the primacy of a provided augmented-reality image with respect to a real-world scene and reduces brightness and power consumption requirements for presenting the augmented-reality image. A plurality of filters of varied light transmissivity may be provided from which to select a desired filter based on environmental lighting conditions and user preference. The light transmissivity of the filter may be about 70% light transmissive to substantially or completely opaque.

20 Claims, 6 Drawing Sheets

ENVIRONMENTAL-LIGHT FILTER FOR SEE-THROUGH HEAD-MOUNTED DISPLAY DEVICE

RELATED APPLICATION

This patent application is a continuation of U.S. application Ser. No. 13/166,346, filed 22 Jun. 2011, now abandoned, which is incorporated herein by reference in the entirety.

BACKGROUND

Head-mounted displays can be used in various applications, including military, aviation, medicine, video gaming, entertainment, sports, and so forth. See-through head-mounted displays allow the user to observe the physical world around him or her, while optical elements add light from one or more small micro-displays into the user's visual path, to provide an augmented reality image. The augmented-reality image may relate to a real-world scene that represents an environment in which a user is located. However, various challenges exist in providing an augmented-reality image that is realistic and that can represent a full range of colors and intensities.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter. In brief and at a high level, this disclosure describes, among other things, an environmental-light filter for an optical see-through head-mounted display device. The head-mounted display device uses the environmental-light filter to increase the primacy of an augmented-reality image as seen by a user. For example, the filter may block light from a real-world scene to avoid the augmented-reality image appearing transparent.

In one embodiment, an environmental-light filter is configured to be removably coupled to an optical see-through head-mounted display (HMD) device. The HMD device includes a see-through lens extending between a user's eye and a real-world scene when the display device is worn by the user. The see-through lens also has a display component that, in combination with an augmented reality emitter, such as a micro-display, provides an augmented-reality image to a user's eye. The environmental-light filter may be selected from a group of filters with varied opacity, from a minimum opacity level which allows a substantial amount of light to pass, to a maximum opacity level which allows little or no light to pass. As such, the environmental-light filter enhances the appearance of the augmented-reality image by reducing or eliminating environmental light that reaches the user's eye.

DESCRIPTION OF THE DRAWINGS

Illustrative embodiments of the invention are described in detail below with reference to the attached drawing figures, and wherein.

DETAILED DESCRIPTION

Figure 1:
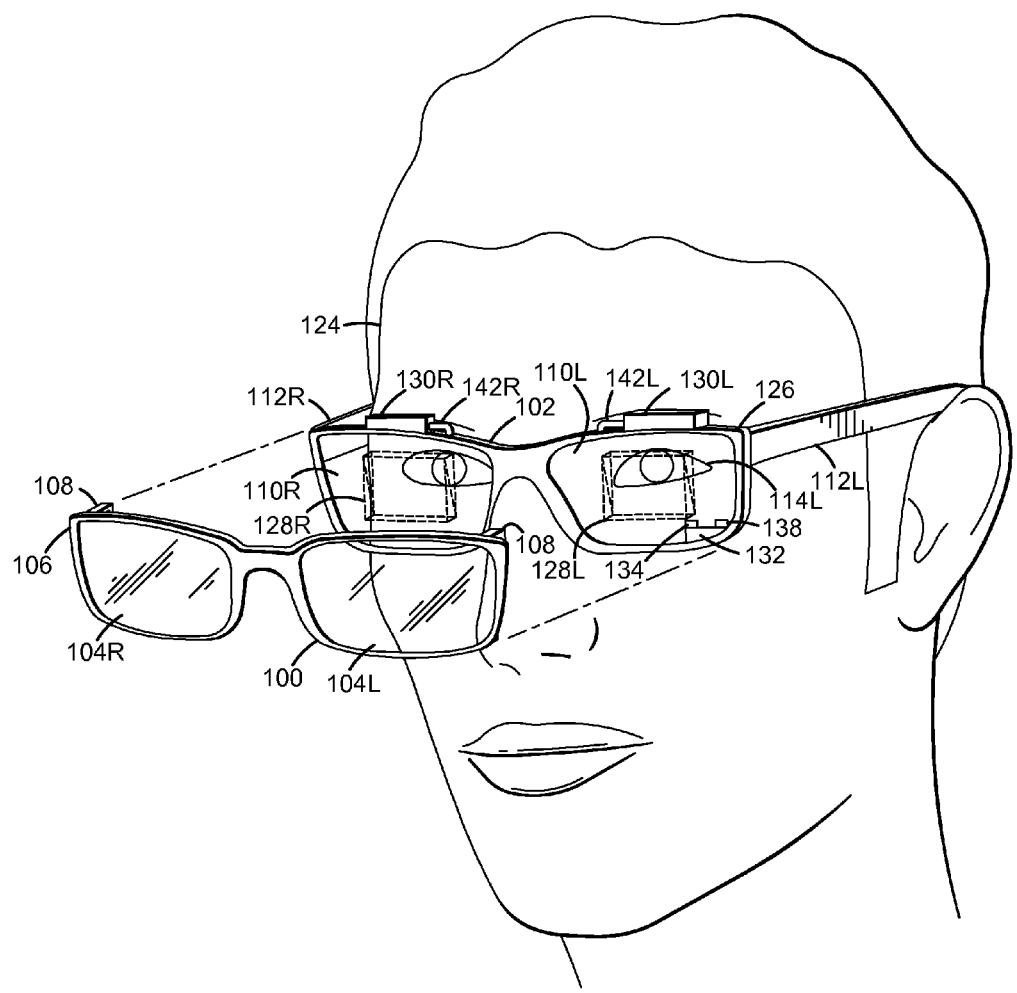
FIG. 1 is perspective view depicting an environmental-light filter and a head-mounted display unit worn on a user's head in accordance with an embodiment of the invention.

The subject matter of select embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

See-through head-mounted displays (HMDs) most often use optical elements such as minors, prisms, and holographic lenses to add light from one or more small micro-displays into a user's visual path. By their very nature, these elements can only add light, but cannot remove light. This means a virtual display cannot display darker colors—they tend towards transparent in the case of pure black—and virtual objects such as augmented reality images seem translucent or ghosted.

For compelling augmented-reality or other mixed-reality scenarios, it is desirable to have the ability to selectively remove natural or environmental light from the view so that virtual color imagery can both represent the full range of colors and intensities, while making that imagery seem more solid or real. Moreover, removal of environmental light reduces power consumption by the augmented-reality emitter because the augmented-reality image can be provided at a lower intensity.

Augmented-reality images as described herein comprise any image, graphic, or other output provided to the user's eye by the augmented-reality emitter. Augmented-reality images provided by an HMD device generally appear superimposed on a background and may appear to interact with or be integral with the background. The background is comprised of a real-world scene, e.g. a scene that a user would perceive without any augmented-reality image emitted by the HMD device. The real-world scene may be similar to what the user would see without the HMD device or a filter lens may be provided between the user's eye and the real-world scene to filter at least a portion of the environmental light from the real-world scene as describe herein.

Without the environmental-light filter, the augmented-reality image may need to be provided at a sufficiently high intensity that is brighter than the corresponding portion of a real-world scene, for the augmented-reality image to be distinct and not transparent. To achieve this goal, a lens of an HMD device can be provided with an environmental-light filter of a selected opacity or light transmissivity to block a desired amount of environmental light.

Environmental-light filter lenses are described herein with respect to their opacity or light transmissivity. Opacity and light transmissivity each refer to an amount of light that is allowed to pass through a lens. An opacity of 100% or a light transmissivity of 0% indicates that no light passes through a lens while an opacity of 0% or light transmissivity of 100% is indicative of a perfectly clear lens. For example, a lens having decreasing transmissivity from about 70% to about 10% exhibits an increasing tinted appearance while a lens having less that about 10-15% transmissivity appears substantially opaque.

In an embodiment, an environmental-light filter lens for a head-mounted display device is disclosed. The filter lens is configured to at least partially filter environmental light received by a user's eye and is removeably coupled to a head-mounted display device having a see-through lens extending between the user's eye and a real-world scene when the head-mounted device is worn by the user. The head-mounted display device includes a display component and an augmented-reality emitter which emits light to the user's eye using the display component to provide an augmented reality image. The filter lens causes the augmented-reality image to appear less transparent than when the filter lens is not coupled to the head-mounted device.

In another embodiment, a head-mounted display device is disclosed. The device includes see-through lens extending between a user's eye and a real-world scene when the head-mounted device is worn by the user. The see-through lens includes a display component that receives light comprising an augmented-reality image and directs the light toward the user's eye. An augmented-reality emitter that emits light to provide the augmented reality image is also provided. The device further includes a frame configured to carry the see-through lens and the augmented reality emitter for wearing on a user's head. A filter lens that has a light transmissivity between 0 and 70% to at least partially filter environmental light received by a user's eye is removeably coupled to the frame. In another embodiment, the frame includes the augmented-reality emitter and the filter lens is substantially opaque.

Figure 2:
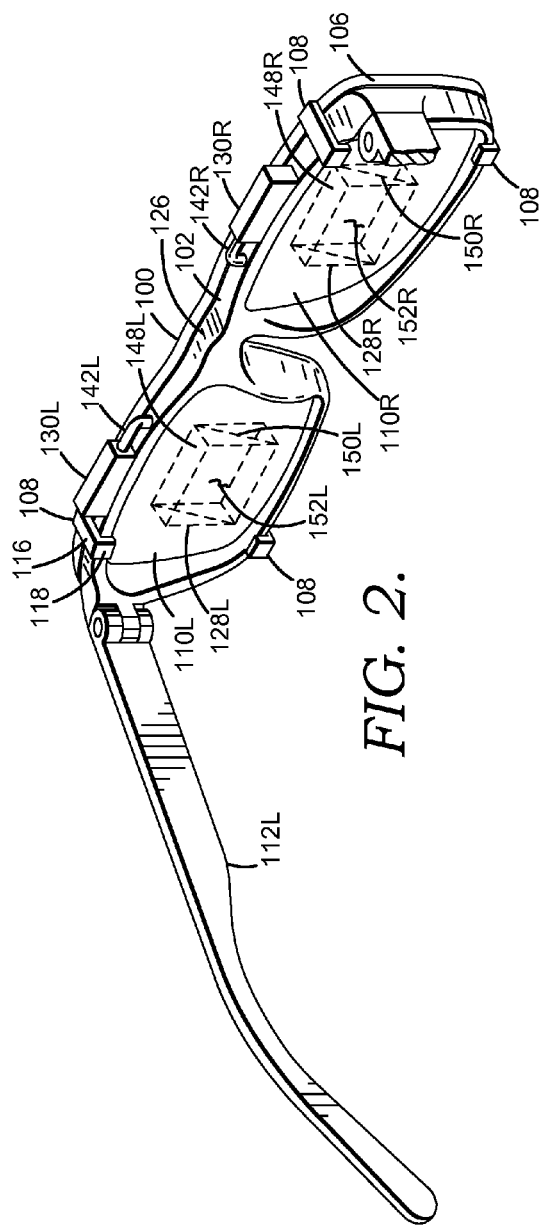
FIG. 2 is a perspective view depicting an environmental-light filter removably coupled to a head-mounted display unit in accordance with an embodiment of the invention.
Figure 3:
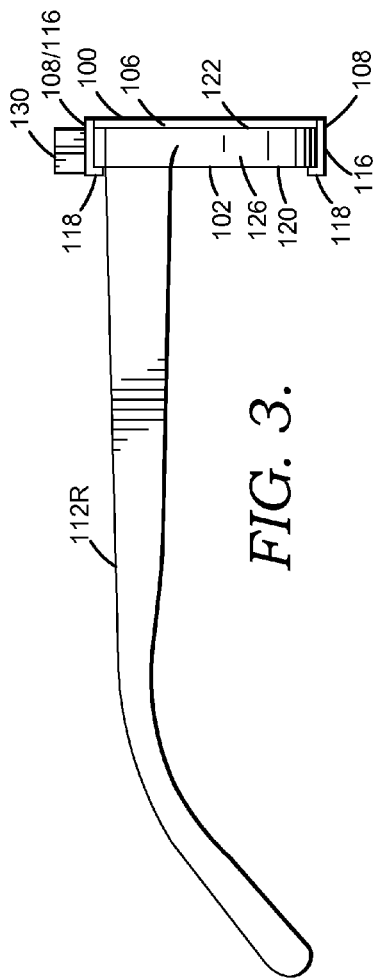
FIG. 3 is an elevational side view of an environmental-light filter removably coupled to a head-mounted display unit in accordance with an embodiment of the invention.

With reference to FIGS. 1-3, an environmental-light filter 100 configured to removeably couple to an HMD device 102 is described in accordance with an embodiment of the invention. The environmental-light filter 100 includes one or more filter lenses 104, a frame 106, and a plurality of coupling features 108. A pair of filter lenses 104 is configured to correspond to a pair of see-through lenses 110 of the HMD device 102. However, in an embodiment, the filter lenses 104 comprise a single lens that extends across both see-through lenses 110 of the HMD device 102. Additionally, the lenses 104 may extend along sides or temples 112 of the HMD device 102 to provide filtering of environmental light from a user's periphery. Alternatively, additional filter lenses (not show) can be provided along the user's periphery and may be coupled to the filter lenses 104 or to the temple 112 of the HMD device 102 directly.

The filter lenses 104 are comprised of any available materials including, for example and not limitation, glass, plastic, metal, rubber, fabrics, composites, or other suitable materials configured to provide a desired level of light transmissivity. The filter lenses 104 might include one or more features such as pigments, tints, colorations, coatings (e.g. anti-glare coatings), or filter layers (e.g. polarizing filters) disposed on surfaces thereof or formed integral therewith. In an embodiment, the features increase the visibility and/or quality of an augmented-reality image. In another embodiment, the features block, absorb, or filter light that is reflected off of a user's eye 114 such that the reflected light is not visible to bystanders viewing the user. Such may avoid an undesired appearance of a user's eyes 114 being illuminated and may secure any data or images viewed by a user from being visible to bystanders.

Additionally, the coatings, filter layers, and any other pigmentation or filtration elements of the lenses 104 are uniform across the entire lens 104 or can include gradients or variations throughout the lens 104. Such might be employed to provide predetermined areas of the lens 104 with increased opacity where portions of an augmented-reality image are commonly displayed.

The filter lenses 104 are configured to filter, block, or absorb a desired amount and/or desired spectrum of wavelengths of environmental light that is incident thereon. Environmental light includes any radiation that a user might ordinarily encounter (e.g., visible light, ultraviolet light, and infrared light) from sources such as the sun, light bulbs, heating elements, and the like. In an embodiment, the filter lenses 104 are configured to filter, block, or absorb substantially all ultraviolet light and infrared light and at least a portion of light received in the visible spectrum. Filtration of infrared light may avoid interference with infrared sensors employed by the HMD device 102.

The frame 106 is configured similarly to a frame employed for eyeglasses. The frame 106 is constructed from any desired materials known in the art and retains the filter lenses 104 in an orientation comparable to that of the see-through lenses 110 of the HMD device 102. In an embodiment, the frame 106 is integral with the filter lenses 104 or is not employed with the filter lenses 104. In another embodiment, the frame 106 is bendable and/or includes one or more hinged joints to enable folding of the environmental-light filter 100 for storage. The frame 106 may also extend along the temples 112 of the HMD device 102 to retain peripheral environmental-light filters (not shown).

The coupling features 108 include any component useable to removably couple the filter lenses 104 and/or the frame 106 to the HMD device 102. The features 108 might include one or more clips, clasps, hooks, tabs, flanges, latches, lugs, or the like. For example, as depicted in FIGS. 1 and 2, the features might include a plurality of tabs 116 extending from the frame 106 with an orthogonally-extending flange 118 at a distal end thereof. The tabs 116 extend the thickness of the HMD device 102 and the flange 118 engages a backside 120 thereof to removeably retain the frame 106 against or adjacent to a front surface 122 of the HMD device 102. The coupling features 108 may provide a coupling by snap-fit, friction-fit, adhesion, or mechanical interlocking, among others.

In an embodiment, a spring-biased clip is mounted on the frame 106 between the filter lenses 104 and is coupled to the HMD device 102 by a user (not shown). In yet another embodiment, a plurality of magnetic elements are included on the frame 106 and magnetically couple to mating elements on the HMD device 102 (not shown). Further, features such as suction cups, static cling, adhesives, or the like might also be employed. The coupling features 108 may also be configure for quick and easy removal of the filter 100 from the HMD device 102 such that a user's normal vision can be easily restored in the event of an emergency.

Although, embodiments of the environmental-light filter 100 are described herein with respect to selected configurations, it is to be understood that the environmental-light filter 100 may be configurable in a variety of ways with additional or different features without departing from the scope described herein. Such configurations are understood as being disclosed herein.

With continued reference to FIG. 1, the HMD device 102 is depicted as worn on a user's head 124. In this example, the HMD device 102 includes a frame 126 similar to a conventional eyeglasses frame and can be worn with a similar comfort level. However, other implementations are possible, such as a face shield which is mounted to the user's head by a helmet, strap or other means. The frame 126 includes a frame front 122 and the temples 112. The frame front 122 holds the see-through lens 110L for the user's left eye and a see-through lens 110R for the user's right eye.

Many components of the environmental-light filter 100 and the HMD device 102 are provided in pairs, one for each eye 114 of a user. Such components are indicated herein by similar reference numbers having an "L" or an "R" appended thereto to indicate a left or right side component, respectively. Or those components are generally referred to by the reference numeral alone.

Figure 4:
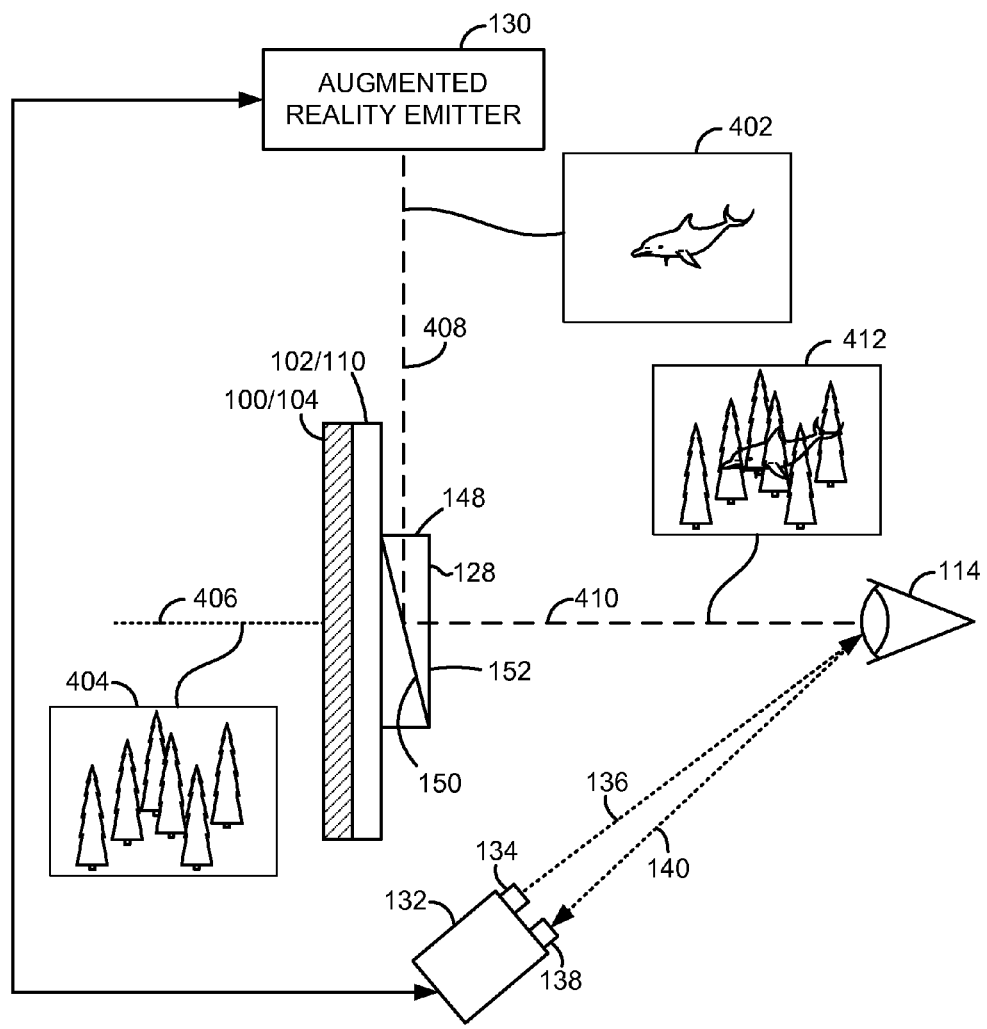
FIG. 4 is a block diagram depicting an environmental-light filter removably coupled to a head-mounted display unit in accordance with an embodiment of the invention.

The left and right orientations are from the user's perspective. The left-side see-through lens 110L includes a light-transmissive environmental-light filter lens 104L removably coupled in association therewith and a light-transmissive optical display component 128L such as a beam splitter which mixes an augmented-reality image 402 with light from a real-world scene 404 for viewing by the left eye 114L, as depicted in FIG. 4. An opening (not shown) in the environmental-light filter lens 104L can be provided to allow an eye tracking component 132 to image the left eye 114L, including the pupil thereof. The opening can be, e.g., a hole in the filter lens 104L, or a region of the filter lens 104L in which the filtering is reduced or not provided. In an embodiment, the eye tracking component 132 employs infrared light and at least a portion of the filter lens 104L has a high light transmissivity for infrared light.

In an embodiment, the eye tracking component 132 includes an infrared (IR) emitter 134 that emits IR light 136 and an IR sensor 138 that senses reflected IR light 140. The eye tracking component 132 is mounted directly on, and inside, the frame 126. In this implementation, the eye tracking component 132 does not need to project infrared light through the filter lens 104 or the see-through lens 110. In another embodiment, the eye tracking component 132 can be mounted to the frame via an arm (not show) that extends from the frame 126.

The right-side see-through lens 110R includes a light-transmissive environmental-light filter 104R removably coupled in association therewith and an optical display component 128, such as a beam splitter that mixes an augmented-reality image 402 with light from a real-world scene 404 for viewing by the right eye 114R. A right-side augmented-reality emitter 130R is mounted to the frame 126 via an arm 142R, and a left-side augmented-reality emitter 130L is mounted to the frame 126 via an arm 142L.

Referring now to FIG. 2, the display device is shown from a perspective of the user looking forward, so that the right-side lens 110R and the left-side lens 110L are depicted. The right-side augmented-reality emitter 130R includes a light emitting portion (not shown), such as a grid of pixels, and a portion which may include circuitry for controlling the light-emitting portion. Similarly, the left-side augmented-reality emitter 130L includes a light-emitting portion and a portion with circuitry for controlling the light emitting portion. In one approach, each of the optical components 128L and 128R may have the same dimensions. The right-side optical component 128R includes a top surface 148R through which light enters from the right-side augmented-reality emitter 130R, an angled half-mirrored surface 150R within the optical component 128R, and a face 152R. Light from the right-side augmented-reality emitter 130R and from portions of a real-world scene (represented by ray 406 in FIG. 4) that are not blocked by the environmental-light filter 104R pass through the face 152R and enter the user's right-side eye 114R.

Similarly, the left-side optical component 128L includes a top surface 148L through which light enters from the left-side augmented-reality emitter 130L, an angled half-mirrored surface 150L within the optical component 128L, and a face 152L. Light from the left-side augmented-reality emitter 130L and from portions of the real-world scene which are not blocked by the environmental-light filter 104L pass through the face 152L and enter the user's left-side eye 114L. Each of the environmental-light filters 104 may have the same dimensions.

Typically, the same augmented-reality image is provided to both eyes 114, although it is possible to provide a separate image to each eye 114, such as for a stereoscopic effect. In an alternative implementation, only one augmented-reality emitter 130 is routed by appropriate optical components to both eyes 114.

With additional reference now to FIG. 4, the operation of the environmental-light filter 100 and the HMD device 102 is described in accordance with an embodiment of the invention. The display device 102 includes the see-through lens 110 which is placed in front of a user's eye 114, similarly to an eyeglass lens. Typically, a pair of see-through lenses 110 is provided, one for each eye 114. The lens 110 includes an optical display component 128, such as a beam splitter, e.g., a half-silvered minor or other light-transmissive minor. Then environmental-light filter 100 is removeably coupled in front of the lens 110. Light from the real-world scene 404, such as a light ray 406, reaches the lens 110 and is partially or completely blocked by the environmental-light filter 100. The light from the real-world scene 404 that passes through the environmental-light filter 100 also passes through the display component 128.

An augmented-reality emitter 130 emits a 2-D array of light representing an augmented-reality image 402 and exemplified by a light ray 408. Additional optics are typically used to refocus the augmented-reality image 402 so that it appears to originate from several feet away from the eye 114 rather than from about one inch away, where the display component 128 actually is.

The augmented-reality image 402 is reflected by the display component 128 toward a user's eye 114, as exemplified by a light ray 410, so that the user sees an image 412. In the image 412, a portion of the real-world scene 404, such as a grove of trees, is visible, along with the entire augmented-reality image 402, such as a flying dolphin. The user therefore sees a fanciful image 412 in which a dolphin flies past trees, in this entertainment-oriented example. In an advertising-oriented example, an augmented-reality image might appear as a can of soda on a user's desk. Many other applications are possible.

Generally, the user can wear the HMD device 102 anywhere, including indoors or outdoors. Various pieces of information can be obtained to determine what type of augmented-reality image 402 is appropriate and where it should be provided on the display component 128. For example, the location of the user, the direction in which the user is looking, and the location of floors, walls and perhaps furniture, when the user is indoors, can be used to decide where to place the augmented-reality image 402 in an appropriate location in the real world scene 404 when combined into the image 412.

The direction in which the user is looking can be determined by tracking a position of the user's head using a combination of motion tracking techniques and an inertial measure unit which is attached to the user's head, such as via the HMD device 102. Motion tracking techniques use a depth sensing camera to obtain a 3-D model of the user. A depth sensing camera can similarly be used to obtain the location of floors, walls, and other aspects of the user's environment. See, e.g., U.S. Patent Publication No. 2010/0197399, published Aug. 5, 2010, titled "Visual Target Tracking," U.S. Patent Publication No. 2010/0194872, published Aug. 5, 2010, titled "Body Scan," and U.S. Pat. No. 7,717,173, issued Apr. 7, 2009, titled "Head Pose Tracking System," each of which is hereby incorporated herein in its entirety by reference.

The tracking camera 132 can be used to identify a location of the user's eye 114 with respect to a frame 126 on which the HMD device 102 is mounted. The frame 126 can be similar to conventional eyeglass frames, in one approach, as depicted in FIGS. 1-3. Typically, such a frame 126 can move slightly on the user's head when worn, e.g., due to motions of the user, slipping of the bridge of the frame on the user's nose, and so forth. By providing real-time information regarding the location of the eye 114 with respect to the frame 126, the augmented-reality emitter 130 can adjust its image 402, accordingly. For example, the augmented-reality image 402 can be made to appear more stable. As depicted in FIG. 1, in an embodiment, the tracking camera 132 includes an infrared (IR) emitter 134 which emits IR light 136 toward the eye 114, and an IR sensor 138 which senses reflected IR light 140.

The position of the pupil can be identified by known imaging techniques such as detecting the reflection of the cornea. See, for example, U.S. Pat. No. 7,401,920, titled "Head Mounted Eye Tracking and Display System," issued Jul. 22, 2008 to Ophir et al., incorporated herein by reference in its entirety. Such techniques can locate a position of the center of the eye 114 relative to the tracking camera 132.

Generally, eye tracking involves obtaining an image of the eye 114 and using computer vision techniques to determine the location of the pupil within the eye socket. Other eye tracking techniques can use arrays of photo detectors and LEDs. With a known mounting location of the tracking camera 132 on the frame 126, the location of the eye 114 with respect to any other location that is fixed relative to the frame 126, such as the environmental-light filter 100 and the display component 128, can be determined. Typically it is sufficient to track the location of one of the user's eyes 114 since the eyes 114 move in unison. However, it is also possible to track each eye 114 separately and use the location of each eye 114 to determine the location of the augmented-reality image 402 for the associated see-through lens 110. In most cases, it is sufficient to know the displacement of the augmented reality glasses relative to the eyes as the glasses bounce around during motion. The rotation of the eyes (e.g., the movement of the pupil within the eye socket) is often less consequential.

In the example depicted in FIG. 1, the tracking camera 132 images the eye 114 from a side position on the frame 126 that is independent from the environmental-light filter 100 and optical display component 128. However, other approaches are possible. For example, light used by the tracking camera 132 could be carried via the display component 128 or otherwise integrated into the lens 110.

In another embodiment, the HMD device 102 provides passive stereoscopic vision. Since the environmental-light filters 100 may be polarized, right and left lenses 104 can be oriented so that the polarization is different by 90 degrees. As such, the HMD device 102 equipped with the environmental-light filters 104 can be used with a comparably equipped 3-D display to view images in 3-D.

Figure 5:
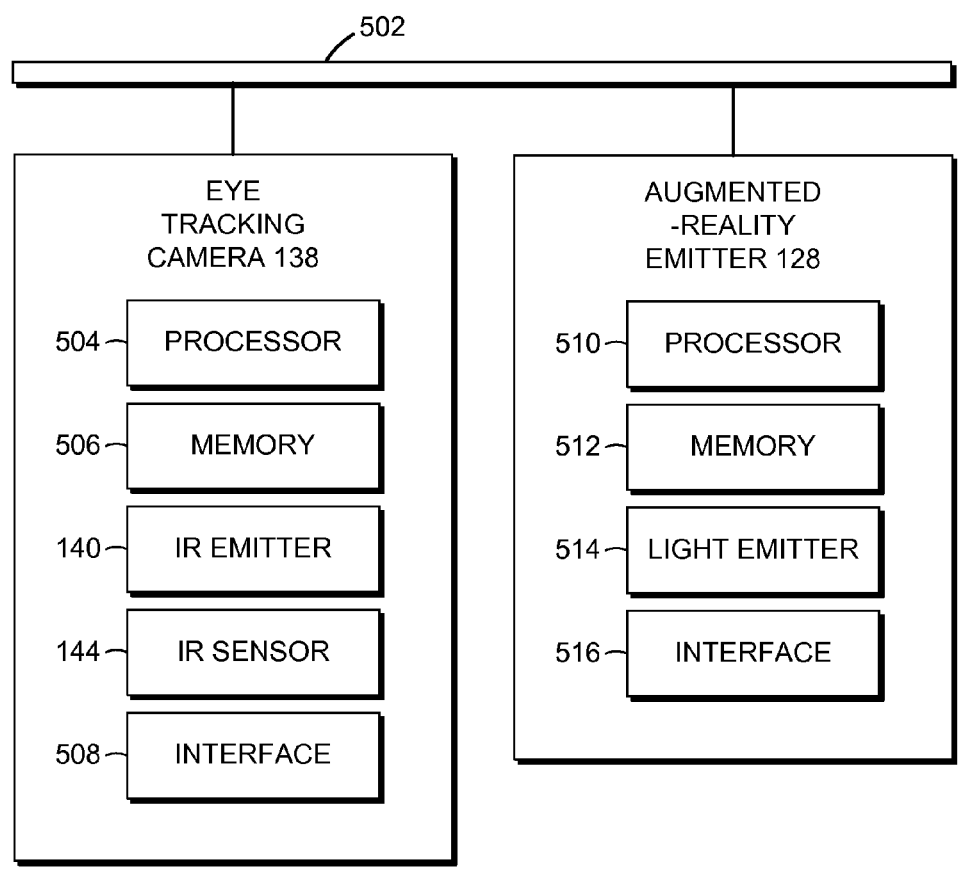
FIG. 5 is a block diagram of a head-mounted display unit in accordance with and embodiment of the invention.

FIG. 5 depicts a system diagram of the HMD device 102 of FIGS. 1-3. The system includes the eye tracking camera 132 and the augmented-reality emitter 130 which can communicate with one another via a bus 502 or other communication paths. The eye tracking camera 132 includes a processor 504, a memory 506, the IR emitter 134, the IR sensor 138, and an interface 508. The memory 506 can contain instructions which are executed by the processor 504 to enable the eye tracking camera 132 to perform its functions as described herein. The interface 508 allows the eye tracking camera 132 to communicate data to the augmented-reality emitter 130 that indicates the relative location of the user's eye 114 with respect to the frame 126.

The augmented-reality emitter 130 includes a processor 510, a memory 512, a light emitter 514 that emits visible light, and an interface 516. The memory 512 can contain instructions which are executed by the processor 510 to enable the augmented-reality emitter 130 to perform its functions as described herein. The light emitter 514 can be a micro-display such as an LCD which emits a 2-D color image in a small area such as one quarter inch square. The interface 516 may be used to communicate with the eye tracking camera 132.

One of more of the processors 504 and 510 can be considered to be control circuits. Moreover, one or more of the memories 506 and 512 can be considered to be a tangible computer-readable storage having computer-readable software embodied thereon for programming at least one processor or control circuit to perform a method for use in an optical see-through HMD device 102 as described herein. The system may further include components, discussed previously, such as for determining a direction in which the user is looking, the location of floors, walls and other aspects of the user's environment.

Figure 6:
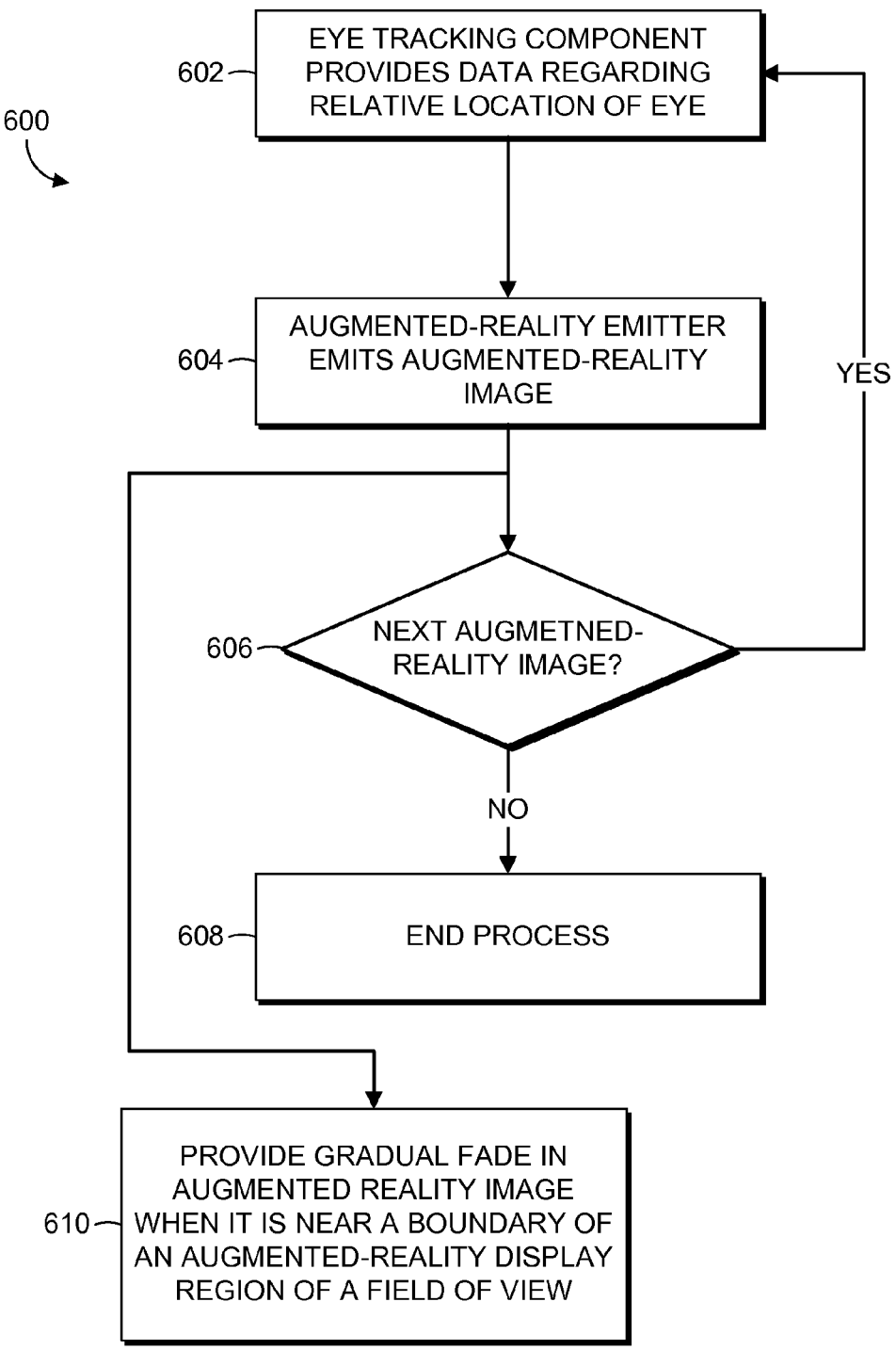
FIG. 6 is a flow diagram depicting a method for providing an augmented-reality image in accordance with an embodiment of the invention.

FIG. 6 depicts a process 600 for providing an augmented-reality image in an HMD device, such as the HMD device 102 with the environmental-light filter 100 coupled thereto. At a step 602, an eye tracking component provides data regarding the relative location of a user's eye(s). Generally, this can be performed several times per second. The data can indicate an offset of the eye from a default location, such as when the eye is looking straight ahead. The location data can be based on the data regarding the relative location of the eye.

An augmented-reality image is an image which is set based on the needs of an application in which it is used. For instance, the previous example of a flying dolphin is provided for an entertainment application. At a step 604, the augmented-reality emitter emits the augmented reality image, so that it reaches the user's eye via one or more optical display components. At a decision step 606, when there is a next augmented reality image, the process is repeated starting at step 602. When there is no next augmented reality image, the process ends at step 608.

The next augmented-reality image can refer to the same augmented-reality image as previously provided, but in a different location, as seen by the user, such as when the previous augmented-reality image is moved to a slightly different location to depict movement of the augmented reality image. The next augmented-reality image can also refer to a new type of image, such as switching from a dolphin to another type of object. The next augmented-reality image can also refer to adding a new object while a previously displayed object continues to be displayed. In one approach, the augmented-reality emitter emits video images at a fixed frame rate. In another approach, static images are emitted and persisted for a period of time which is greater than a typical video frame period.

Step 610 optionally provides a gradual fade in the augmented reality image, such as when it is near a boundary of an augmented reality display region of a field of view. The augmented reality display region can be defined by the maximum angular extent (vertically and horizontally) in the user's field of view in which the augmented-reality image is constrained, due to limitations of the augmented-reality emitter and/or optical components 128. Thus, the augmented-reality image can appear in any portion of the augmented reality display region, but not outside the augmented reality display region.

Generally, the field of view of a user is the angular extent of the observable world, vertically and horizontally, that is seen at any given moment. Humans have an almost 180-degree forward-facing field of view. However, the ability to perceive color is greater in the center of the field of view, while the ability to perceive shapes and motion is greater in the periphery of the field of view.

Furthermore, as mentioned, the augmented-reality image is constrained to being provided in a subset region of the user's field of view. In an exemplary implementation, the augmented-reality image is provided in the center of the field of view over an angular extent of about 20 degrees, which lines up with the fovea of the eye. This is the augmented reality display region of the field of view. The augmented-reality image is constrained by factors such as the size of the optical components used to route the augmented-reality image to the user's eye.

Figure 7A:
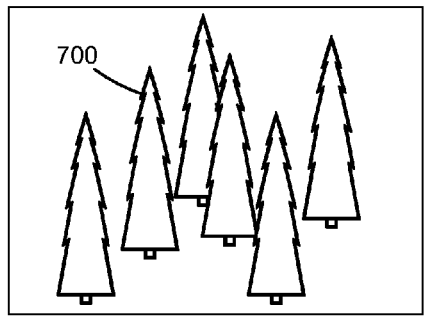
FIG. 7A is an exemplary image of a real-world scene in accordance with an embodiment of the invention.
Figure 7B:
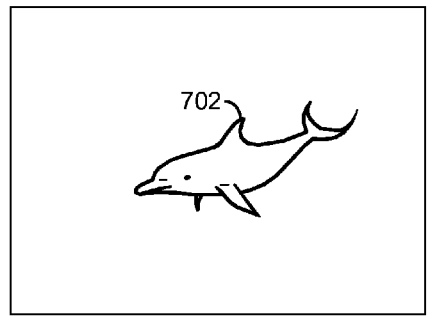
FIG. 7B is an exemplary image of an augmented-reality image in accordance with an embodiment of the invention.
Figure 7C:
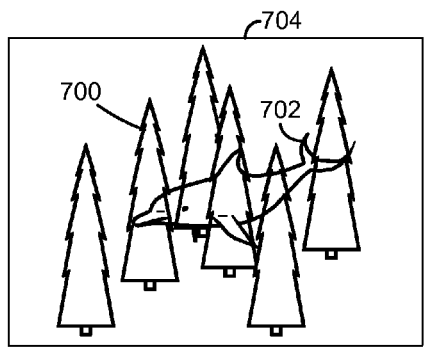
FIG. 7C is an exemplary image of a combined image without an environmental-light filter in accordance with an embodiment of the invention.

Referring now to FIGS. 7A-F, exemplary images provided by environmental-light filters removably coupled to an HMD device are described in accordance with an embodiment of the invention. The images of the FIGS. 7A-F are depicted as viewed by a user wearing an HMD device and under identical environmental lighting conditions. FIG. 7A depicts a real-world scene 700 that might be viewed by a user wearing the HMD device without the environmental filter coupled thereto. An exemplary augmented-reality image 702 is depicted in FIG. 6B and a combined image 704 comprised of the real-world scene 700 and the augmented-reality image 702 is depicted in FIG. 7C.

As depicted in FIG. 7C, the augmented-reality image 702 appears generally transparent and the real-world scene 700 is visible through the augmented reality image 702. This combined image 704 might be the result of viewing when environmental lighting conditions are bright and/or when the brightness of the augmented-reality image 702 is too dim with respect to the real-world scene 700. To overcome the transparent effect, the brightness of the augmented-reality image 702 may be increased, however the brightness required to sufficiently overcome environmental lighting may exceed the HMD device's capabilities, increase power consumption, and result in an uncomfortable viewing experience for a user. The transparent effect might also be overcome by applying an environmental-light filter, such as the environmental-light filter 100.

Figure 7D:
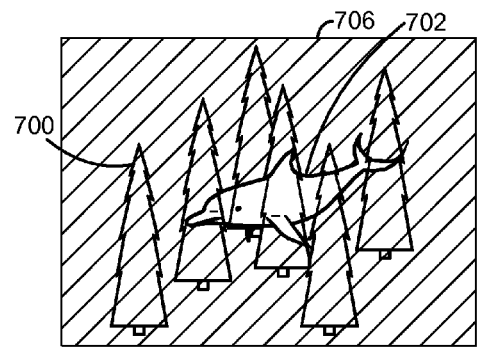
FIG. 7D is an exemplary image of a combined image with an environmental-light filter having a light transmissivity of about 70% in accordance with an embodiment of the invention.

FIG. 7D depicts a combined image 706 that might be viewed by a user with a mild environmental-light filter removably coupled to an HMD device. In an embodiment, the mild environmental-light filter has a light transmissivity between about 70 and about 50%%, however any light transmissivity from about 100 to about 50% might be employed. As such, the augmented-reality image 702 appears more opaque or solid, however the real-world scene 700 is still, at least partially visible through the augmented-reality image 702.

Figure 7E:
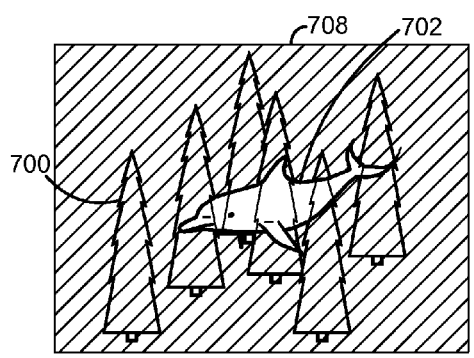
FIG. 7E is an exemplary image of a combined image with an environmental-light filter having a light transmissivity of about 50% in accordance with an embodiment of the invention.

FIG. 7E depicts a combined image 708 that might be viewed by a user with a strong environmental-light filter removably coupled to an HMD device. In an embodiment, the strong environmental-light filter has a light transmissivity between about 15 and about 50%. As such, the augmented-reality image 702 appears more opaque or solid, and the real-world scene 700 is not clearly visible through the augmented-reality image 702. The real-world scene 700 is at least partially visible outside the augmented-reality image 702.

Figure 7F:
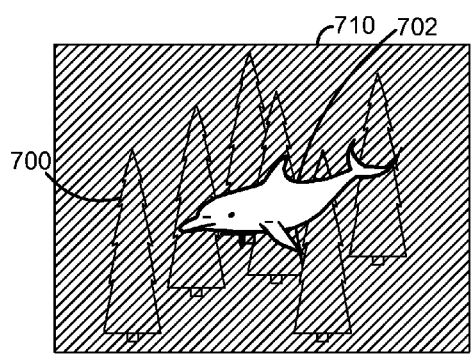
FIG. 7F is an exemplary image of a combined image with an environmental-light filter having a light transmissivity of about 10% in accordance with an embodiment of the invention.

FIG. 7F depicts a combined image 710 that might be viewed by a user with a substantially opaque environmental-light filter removably coupled to an HMD device. In an embodiment, the substantially opaque environmental-light filter has a light transmissivity between about 15 and about 0%. As such, the augmented-reality image 702 appears opaque or solid and the real-world scene 700 is only visible to a very small extent or is not visible.

As depicted in FIGS. 7A-F, environmental-light filters are selectable based on a level of light transmissivity to provide a desired appearance in a combined image. For example, a user might select a mild filter to enhance an augmented-reality image to a small extent, such as when the augmented-reality image is only being viewed periodically or nonchalantly, e.g. the augmented-reality image may provide a heads-up display of the current time and date which the user only periodically focuses his or her attention on. Or the user might select a mild filter on a cloudy day or when in low environmental lighting conditions because greater filtration of the environmental light is not needed. Such, may provide the user with a desired viewing experience of the augmented-reality image while also not obstructing the user's ability to view the real-world scene.

Alternatively, a user might desire to view an augmented-reality image without the real-world scene. Thus, the user might select a substantially opaque environmental-light filter. For instance, a user playing a video game, reading a book, or watching a movie via the augmented-reality image while sunbathing on a beach would likely desire to block out most of the environmental light to provide sufficient viewability of the augmented-reality image.

Accordingly, environmental-light filters might be provided in a kit that includes a plurality of filters each having a different light transmissivity. As such, a user can select an environmental-light filter based on environmental conditions and a desired viewing experience.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. An environmental-light filter lens for a head-mounted display device, comprising:
a filter lens configured to at least partially filter environmental light received by a user's eye, and removeably coupled to a head-mounted display device to cause an augmented-reality image to appear less transparent than when the filter lens is not coupled to the head-mounted device, the head mounted device including a see-through lens extending between the user's eye and a real-world scene when the head-mounted device is worn by the user, a display component, and an augmented-reality emitter which emits light to the user's eye using the display component to provide the augmented reality image.

2. The environmental-light filter lens of claim 1, wherein the head-mounted display device includes a frame and the filter lens includes one or more features configured to couple to the frame.

3. The environmental-light filter lens of claim 2, wherein the features include one or more of clips, clasps, hooks, tabs, flanges, latches, or lugs for removeably coupling the filter lens to the frame.

4. The environmental-light filter lens of claim 1, wherein the filter lens has a light transmissivity between 0 and 70%.

5. The environmental-light filter lens of claim 4, wherein the filter lens is substantially opaque.

6. The environmental-light filter lens of claim 1, wherein the filter lens includes one or more substantially opaque regions.

7. The environmental-light filter lens of claim 1, wherein the filter lens blocks ultraviolet light, infrared light, and at least a portion of light in the visible spectrum.

8. The environmental-light filter lens of claim 1, wherein the filter lens includes one or more coatings configured to absorb light from the augmented-reality image that is reflected off of the user.

9. The environmental-light filter lens of claim 2, wherein the head-mounted display device further comprises a tracking component that tracks a location of the user's eye relative to the frame.

10. The environmental-light filter lens of claim 1, wherein the display component comprises at least one optical component that combines light from the real-world scene and light representing the augmented reality image, the display component being between the filter lens and the user's eye.

11. A head-mounted display device, comprising:
a see-through lens extending between a user's eye and a real-world scene when the head-mounted device is worn by the user, the see-though lens including a display component that receives light comprising an augmented-reality image and directs the light toward the user's eye;
an augmented-reality emitter that emits light to provide the augmented reality image;
a frame configured to carry the see-through lens and the augmented reality emitter for wearing on a user's head; and
a filter lens that has a light transmissivity between 0 and 70% to at least partially filter environmental light received by a user's eye, and that is removeably coupled to the frame.

12. The head-mounted display device of claim 11, wherein the filter lens causes the augmented-reality image to appear less transparent than when the filter lens is not coupled to the head-mounted device.

13. The head-mounted display device of claim 11, wherein the filter lens includes one or more features configured to couple to the frame.

14. The head-mounted display device of claim 11, wherein the features include one or more of clips, clasps, hooks, tabs, flanges, latches, or lugs for removeably coupling the filter lens to the frame.

15. The head-mounted display device of claim 11, wherein the filter lens is made from one or more of a glass, plastic, metal, fabric, and a composite.

16. The head-mounted display device of claim 11, wherein the filter lens substantially blocks ultraviolet light and infrared light in the environmental light from being received by the user's eye.

17. A head-mounted display device, comprising:
a see-through lens extending between a user's eye and a real-world scene when the head-mounted device is worn by the user, the see-though lens including a display component that receives light comprising an augmented-reality image and directs the light toward the user's eye;
a frame configured to carry the see-through lens for wearing on a user's head and including an augmented-reality emitter that emits light to provide the augmented reality image; and
a filter lens that is substantially opaque and substantially filters environmental light received by a user's eye, the filter lens being removeably coupled to the frame.

18. The head-mounted display device of claim 17, wherein filtering of the environmental light by the filter lens causes the augmented-reality image to be a primary image seen by a user.

19. The head-mounted display device of claim 17, wherein the filter lens includes one or more features that provide one or more of a snap-fit, a friction fit, or magnetic coupling between the filter lens and the frame.

20. The head-mounted display device of claim 17, wherein filter lens has a light transmissivity between 0 and 10%.

* * * * *